(12) United States Patent
Tokuhisa (10) Patent No.: US 11,867,621 B2
(45) Date of Patent: Jan. 9, 2024

(54) TERAHERTZ LIGHT DETECTOR AND TERAHERTZ MEASUREMENT DEVICE

(71) Applicant: NIKON CORPORATION, Tokyo (JP)

(72) Inventor: Akira Tokuhisa, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 55 days.

(21) Appl. No.: 17/439,988

(22) PCT Filed: Mar. 18, 2020

(86) PCT No.: PCT/JP2020/012005
§ 371 (c)(1),
(2) Date: Dec. 16, 2021

(87) PCT Pub. No.: WO2020/189722
PCT Pub. Date: Sep. 24, 2020

(65) Prior Publication Data
US 2022/0146420 A1    May 12, 2022

(30) Foreign Application Priority Data

Mar. 20, 2019   (JP) .................................. 2019-053682

(51) Int. Cl.
*G01N 21/3586* (2014.01)
(52) U.S. Cl.
CPC . *G01N 21/3586* (2013.01); *G01N 2201/0697* (2013.01); *G01N 2201/06113* (2013.01)
(58) Field of Classification Search
CPC ..... G01N 21/3586; G01N 2201/06113; G01N 2201/0697
See application file for complete search history.

(56) References Cited

U.S. PATENT DOCUMENTS

| | | | |
|---|---|---|---|
| 2015/0136987 A1* | 5/2015 | Kajiki | G02F 1/365 250/493.1 |
| 2015/0369742 A1 | 12/2015 | Tamada et al. | |
| 2019/0120757 A1 | 4/2019 | Watanabe et al. | |

FOREIGN PATENT DOCUMENTS

| | | |
|---|---|---|
| JP | 2010-237228 A | 10/2010 |
| JP | 2012-230050 A | 11/2012 |
| JP | 2013-068528 A | 4/2013 |
| JP | 2014-029478 A | 2/2014 |
| JP | 2016-085156 A | 5/2016 |
| JP | 6266719 B1 | 1/2018 |

(Continued)

OTHER PUBLICATIONS

Aug. 30, 2022, Office Action Issued in Japanese Patent Application No. 2021-507398.

(Continued)

*Primary Examiner* — David P Porta
*Assistant Examiner* — Fani Polyzos Boosalis
(74) *Attorney, Agent, or Firm* — Oliff PLC (57) ABSTRACT

A terahertz light detector includes: a light reception unit that receives terahertz light from a measured object; a pulse laser that generates pulse light; an optical member which the pulse light enters; and a control unit that controls the energy of the pulse light which enters the optical member, wherein the optical member has anomalous dispersion, and the light reception unit outputs a signal that is dependent on an intensity of terahertz light when the pulse light emitted from the optical member enters the light reception unit.

20 Claims, 7 Drawing Sheets

(56) References Cited

FOREIGN PATENT DOCUMENTS

| JP | 2018-036121 A | 3/2018 |
| WO | 2014/007386 A1 | 1/2014 |
| WO | 2014/125729 A1 | 8/2014 |

OTHER PUBLICATIONS

Jun. 30, 2020 International Search Report issued in International Patent Application No. PCT/JP2020/012005.
Jun. 30, 2020 Written Opinion issued in International Patent Application No. PCT/JP2020/012005.
Palaci. J. et al., "SOA-based optical processing for terahertz time-domain spectroscopy," Electronics Letters, 2012, vol. 48, No. 10, pp. 593-594.
Mar. 22, 2023 Office Action issued in Japanese Patent Application No. 2021-507398.

\* cited by examiner

TERAHERTZ LIGHT DETECTOR AND TERAHERTZ MEASUREMENT DEVICE

TECHNICAL FIELD

The present invention relates to a terahertz light detector and a terahertz measurement device.

BACKGROUND

In the related art, a terahertz time domain spectroscopic device is known which physically moves a reflection mirror, changes an optical path length, and allows a delay time of probe pulse light to be changeable (for example, refer to Patent Document 1). However, there is a problem in that modulation of the delay time is slow.

RELATED ART DOCUMENTS

Patent Document

[Patent Document 1] Japanese Patent No. 6266719

SUMMARY OF INVENTION

According to a first aspect, a terahertz light detector includes: a light reception unit that has a light reception surface which receives measured light; a pulse laser that generates pulse light; an optical member which the pulse light enters; and a control unit that controls the energy of the pulse light which enters the optical member, wherein the optical member has anomalous dispersion, and the light reception unit outputs a signal that is dependent on an intensity of terahertz light when the pulse light emitted from the optical member enters the light reception unit.

BRIEF DESCRIPTION OF THE DRAWINGS

FIG. 4(a) is a graph showing a relationship between a pulse energy of pulse light when entering an optical fiber and a delay time when exiting the optical fiber, and FIGS. 4(b) and (c) are graphs showing relationships between a pulse energy of pulse light when entering an optical fiber, and a center wavelength shift amount and a pulse temporal width of the pulse light when exiting the optical fiber, respectively.

DESCRIPTION OF EMBODIMENTS

A terahertz time domain spectrometer (terahertz light detector) of an aspect of the present invention includes: a fiber having anomalous dispersion; and a control unit that controls the energy of pulse light which enters the fiber. The pulse light that enters the fiber is emitted from the fiber with a delay time corresponding to the energy and enters a light reception unit as probe pulse light. The light reception unit outputs a signal that is dependent on an intensity of measured light that is received by a light reception surface when the probe pulse light emitted from the fiber enters the light reception unit. That is, the terahertz time domain spectrometer of the aspect of the present invention can control the delay time of the probe pulse light that enters the light reception unit without using a mechanically driven delay mechanism. Thereby, it is possible to change the delay time of the probe pulse light at a high speed with a simple configuration as compared to a case in which the delay time of the probe pulse light that enters the light reception unit is controlled using a mechanically driven delay mechanism. Hereinafter, embodiments are described in detail.

First Embodiment

A terahertz time domain spectrometer according to a first embodiment is described with reference to the drawings. The present embodiment is specifically described for the purpose of understanding the gist of the invention and does not limit the present invention unless otherwise specified.

Figure 1:
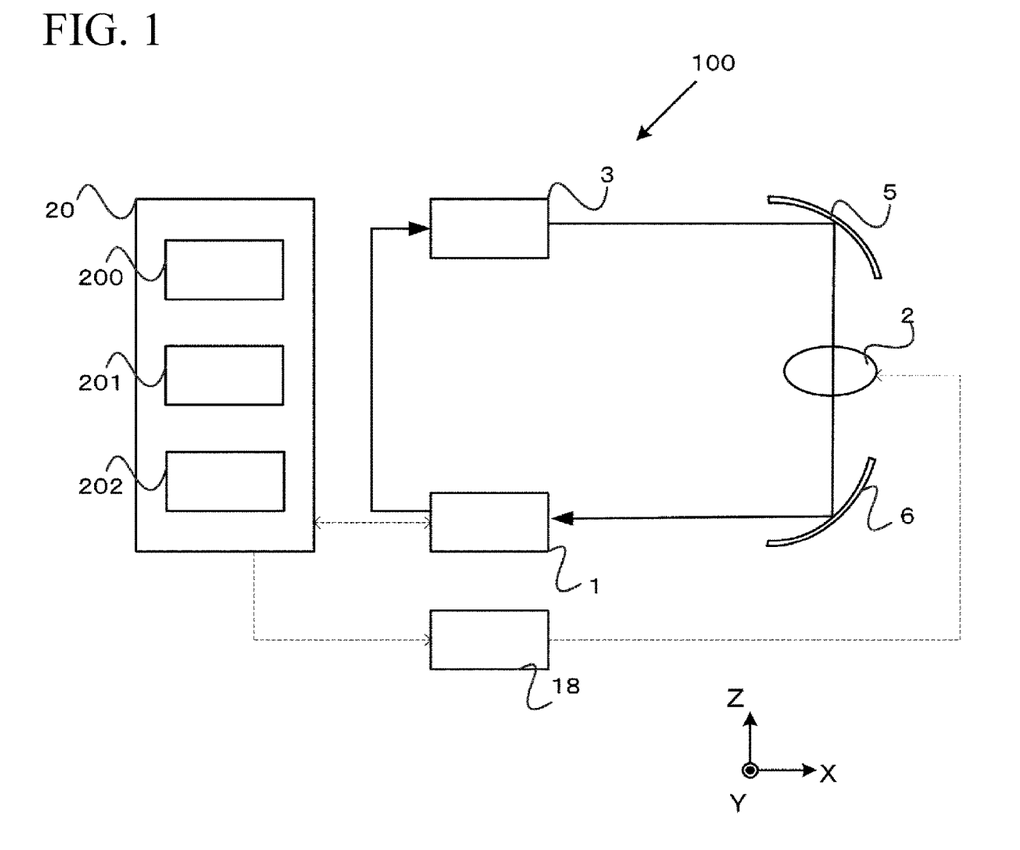
FIG. 1 is a block diagram schematically showing a main part configuration of a terahertz measurement device that has a terahertz time domain spectrometer according to an embodiment.

FIG. 1 is a block diagram schematically showing an example of a main part configuration of a terahertz measurement device 100 having a terahertz time domain spectrometer 1 according to the present embodiment. In FIG. 1, a route of pulse light is indicated by a solid line, and a signal line for transmitting and receiving various information is indicated by a dashed line. Further, for the convenience of explanation, an orthogonal coordinate system constituted of an X axis, a Y axis, and a Z axis is set as shown in the drawing.

The terahertz measurement device 100 of the present embodiment performs measurement by terahertz time domain spectroscopy (TDS). The terahertz measurement device 100 irradiates a measured object 2 with terahertz pulse light as measured light and detects a change (temporal change) in accordance with a time elapse in an intensity of measured light that includes information of the measured object 2. The terahertz measurement device 100 generates a waveform (time domain waveform) by combining the changes in the intensity of the measured light on the basis of signals detected discretely at different detection times and acquires amplitude information of each frequency component of the measured light by performing Fourier transform of the waveform. The measured object 2 can be various substances such as a solid or a liquid.

First, a configuration of the terahertz measurement device 100 is described.

The terahertz measurement device 100 mainly includes the terahertz time domain spectrometer 1 that receives measured light, an emission unit 3 that emits the measured light, a first optical unit 5, a second optical unit 6, a drive mechanism 18, and a control unit 20.

The emission unit 3 generates measured light and emits the measured light toward a measured object 2 placed on, for example, a mounting table (not shown) or the like. The emission unit 3 is a known terahertz pulse light source and is, for example, a photoconductive antenna (photoconductive member) that includes an optical switch element and a bias circuit. In this case, the optical switch element is a photoconductive antenna element that has a semiconductor substrate constituted of a gallium arsenide (LT-GaAs)

formed according to crystal growth at low temperature on a semi-insulating gallium arsenide (SI-GaAs) and a metal electrode having a narrow gap on the semiconductor substrate. When the gap of the metal electrode is irradiated with pulse light (pump pulse light) emitted from a laser light source 10 (refer to FIG. 2) described later included in the terahertz time domain spectrometer 1 in a state where the bias circuit applies a bias voltage on the metal electrode, a free electron in the semiconductor substrate is excited. The free electron is accelerated by a bias electric field, and electromagnetic waves, that is, measured light is generated. The emission unit 3 is not limited to the photoconductive antenna, and a non-linear optical crystal such as, for example, zinc telluride (ZnTe) or lithium niobate ($LiNbO_3$) may be used. In this case, when the non-linear optical crystal described above is irradiated with pump pulse light, the measured light is generated by a secondary non-linear optical effect.

The measured light emitted from the emission unit 3 is focused by the first optical unit 5 and irradiates the measured object 2. Part of the measured light that has irradiated the measured object 2 is reflected at a surface (front surface) on the first optical unit 5 side of the measured object 2 and at a surface (rear surface) on the second optical unit 6 side of the measured object 2, another part of the measured light is absorbed by the measured object 2, and the rest of the measured light transmits through the measured object 2. The measured light that has transmitted through the measured object 2 is focused by the second optical unit 6 and enters the terahertz time domain spectrometer 1. In the example shown in FIG. 1, a case is shown in which a parabolic mirror is used as the first optical unit 5 and the second optical unit 6; however, the first optical unit 5 and the second optical unit 6 may be a planar mirror, a condenser lens, or the like, or may be a combination thereof.

In the example of FIG. 1, an example is shown in which the measured light that has transmitted through the measured object 2 is received by the terahertz time spectrometer 1; however, a configuration may be employed in which the measured light reflected at the front surface or the rear surface of the measured object 2 is detected in accordance with the purpose of use of the terahertz measurement device 100. In any case, the terahertz measurement device 100 has a configuration that detects measured light which interacts with the measured object 2 by passing through the measured object 2 and includes information on the property of the measured object 2.

The drive mechanism 18 is controlled by the control unit 20 described later and two-dimensionally changes a relative position among the first optical unit 5, the second optical unit 6, and the measured object 2 at least on a XY plane. In the present embodiment, the drive mechanism 18 has, for example, a motor, a guide rail, or the like and moves the mounting table (not shown) on which the measured object 2 is placed on the XY plane. The drive mechanism 18 may move the emission unit 3, the first optical unit 5, the second optical unit 6, and a light reception unit 14 (refer to FIG. 2) described later. The drive mechanism 18 changes the relative position at a predetermined interval. The predetermined interval may be a predetermined fixed value or may be a variable value that can be set by a user depending on the size of the measured object 2 or the like. By changing the relative position by the drive mechanism 18, it is possible to irradiate a different position (irradiation position) on the XY plane with the measured light. Each time the irradiation position is changed by the drive mechanism 18, the terahertz measurement device 100 performs emission of the measured light from the emission unit 3 and detection of the measured light by the terahertz time domain spectrometer 1.

As described below, the terahertz time domain spectrometer 1 emits the pump pulse light to the emission unit 3, detects the measured light that is emitted from the emission unit 3 and passes through the measured object 2 via the second optical unit 6, and outputs the detection signal. Details of the terahertz time domain spectrometer 1 will be described later.

The control unit 20 is a processor that has a microprocessor, a peripheral circuit thereof, or the like and controls each portion of the terahertz measurement device 100 by reading and executing a control program stored in advance in a storage medium (not shown) (for example, a flash memory or the like). The control unit 20 may be constituted of a CPU, an ASIC, a programmable MPU, or the like. The control unit 20 includes a drive control portion 200, a delay time control portion 201, and a measurement data generation portion 202. In order to change the irradiation position described above, the drive control portion 200 outputs, to the drive mechanism 18, a signal that commands a movement amount and a movement direction of the mounting table. The delay time control portion 201 controls a delay control unit 12 (refer to FIG. 2) included in the terahertz time domain spectrometer 1 and controls the timing (delay time) of the pulse light (probe pulse light) that enters the light reception unit 14 (refer to FIG. 2). The measurement data generation portion 202 generates a time domain waveform of the intensity of the measured light at each irradiation position changed by the drive mechanism 18 and acquires amplitude information at each frequency by performing Fourier transform on the generated time domain waveform. The measurement data generation portion 202 can generate a two-dimensional measurement image that represents an internal state of the measured object 2 by using the amplitude information acquired for each changed irradiation position.

Next, the terahertz time domain spectrometer 1 is described in detail.

Figure 2:
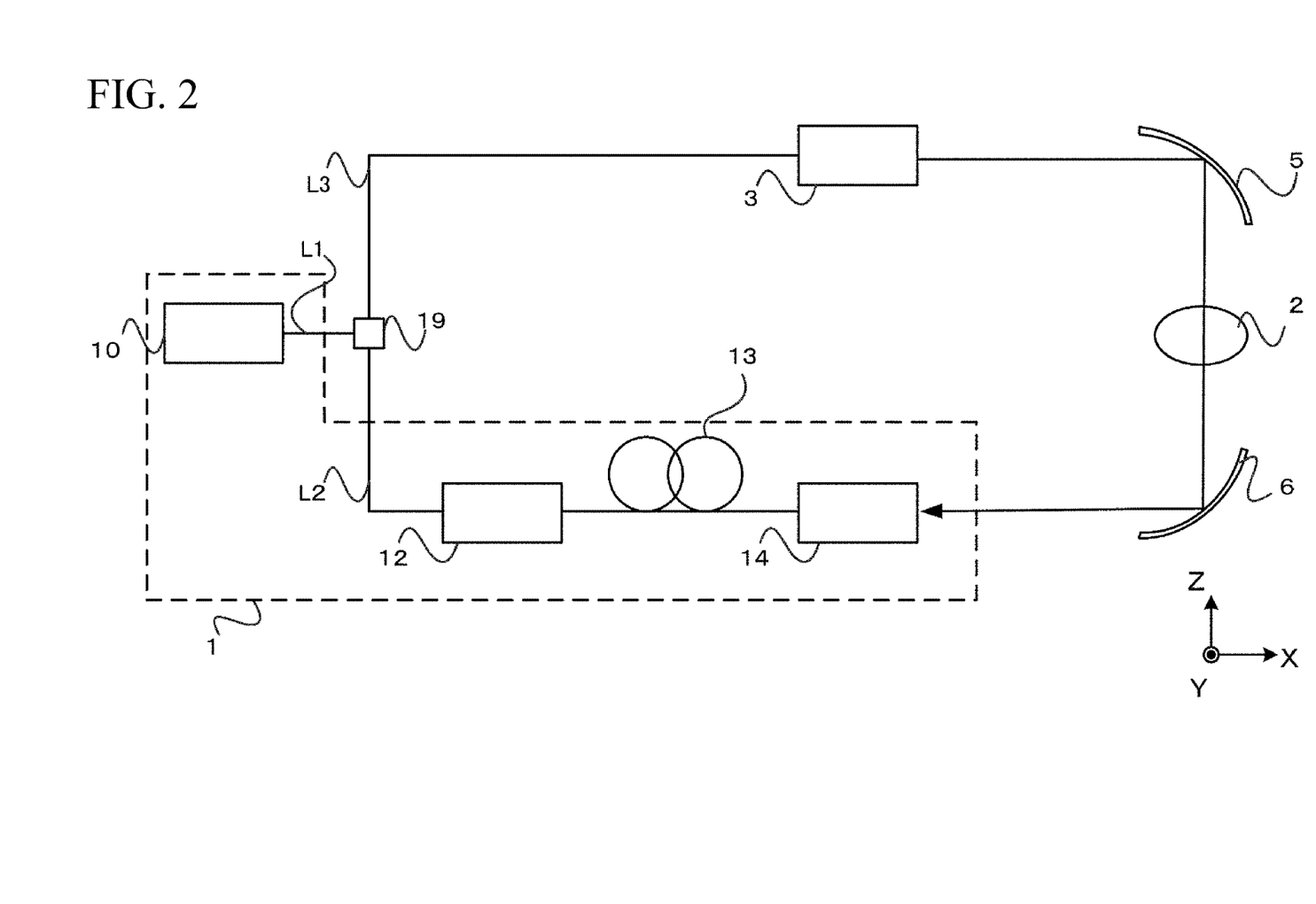
FIG. 2 is a block diagram schematically showing a main part configuration of a terahertz time domain spectrometer according to a first embodiment.

FIG. 2 is a view schematically showing an example of a main part configuration of the terahertz time domain spectrometer 1, the emission unit 3, the first optical unit 5, and the second optical unit 6. The terahertz time domain spectrometer 1 mainly includes the laser light source 10, the delay control unit 12, an optical fiber 13, and the light reception unit 14.

The laser light source 10 generates, for example, pulse light of a near infrared wavelength region having a pulse temporal width of about 100 femtoseconds (fs) at a predetermined repetition frequency that is, for example, several hundred megahertz. The laser light source 10 includes, for example, a master oscillator such as an Er fiber mode-locked laser or a Tm fiber mode-locked laser. The pulse light output from the laser light source 10 propagates through an optical path L1 and branches into first pulse light and second pulse light, for example, by a branch unit 19 such as a branch coupler or a half mirror. The second pulse light propagates through an optical path L3 as pump pulse light and enters the emission unit 3.

The measured light is generated from the emission unit 3 which the pump pulse light enters. The pulse width of the measured light is very short and is, for example, about 1 picosecond. Pulse light is emitted from the laser light source 10 at a predetermined repetition frequency (for example, several hundred megahertz). That is, the laser light source 10 emits the pulse light at a predetermined pulse interval. Accordingly, the measured light is emitted from the emission unit 3 at a predetermined pulse interval described above. The measured object 2 is irradiated through the first optical unit 5 with the measured light that is emitted from the emission unit 3. Among the measured light that enters the measured object 2, the measured light that has transmitted through the measured object 2 enters the light reception unit 14 through the second optical unit 6.

Among the pulse light emitted from the laser light source 10, the first pulse light that propagates through an optical path L2 enters the delay control unit 12. The delay control unit 12 controls the energy of the first pulse light as described later in detail. The delay control unit 12 may be, for example, a variable gain optical amplifier constituted of a fiber amplifier, a semiconductor amplifier, or the like, may be a modulator such as an acousto-optic modulator (AOM) or an electro-optic modulator (EOM), or may have both the above-described modulator and a fixed gain optical amplifier.

The optical fiber 13 is a fiber having anomalous dispersion. The first pulse light propagates through the optical fiber 13 in a state like a fundamental soliton. Here, the fundamental soliton means a state in which effects of dispersion and self-phase modulation are balanced, and the waveform (a pulse temporal width and a peak intensity of the first pulse light) is maintained. However, in practice, due to the effect of Raman scattering in the optical fiber 13, the center wavelength of the first pulse light gradually shifts toward the long wavelength side when propagating through the optical fiber 13. The shift to the long wavelength side leads to a decrease in a group velocity of the first pulse light. That is, the timing at which the first pulse light is emitted from the optical fiber 13 is delayed compared to a case where the effect of Raman scattering is not considered. As described in detail later, when it is assumed that the pulse temporal width of the first pulse light that enters the optical fiber 13 is constant, the amount (delay amount) of this timing delay increases as the pulse energy of the first pulse light increases. Accordingly, by appropriately controlling the pulse energy of the first pulse light that enters the optical fiber 13, the delay time until the first pulse light that is emitted from the optical fiber 13 enters the light reception unit 14 as the probe pulse light, that is, an incident timing, can be controlled.

The light reception unit 14 has a light reception surface that receives the measured light and outputs a detection signal depending on the intensity of the measured light passing through the measured object 2 and received by the light reception surface when the first pulse light emitted from the optical fiber 13 is incident as the probe pulse light. The light reception unit 14 is a photoconductive antenna that includes, for example, an optical switch element and a current-voltage conversion circuit (IV conversion circuit). In this case, similarly to the emission unit 3, the optical switch element is a photoconductive antenna element that has a semiconductor substrate constituted of a gallium arsenide (LT-GaAs) formed according to a crystal growth at low temperature on a semi-insulating gallium arsenide (SI-GaAs) and a metal electrode having a narrow gap on the semiconductor substrate. The semi-insulating gallium arsenide (SI-GaAs) side of the photoconductive antenna is the light reception surface that receives the measured light. When the gap of the metal electrode of the photoconductive antenna element is irradiated with the probe pulse light, a free electron in the semiconductor substrate is excited. When the free electron is accelerated by the incident intensity of the measured light that has entered the light reception unit 14, that is, the oscillating electric field of the measured light, a current that is proportional to the oscillating electric field of the measured light flows through the metal electrode. The light reception unit 14 has an I-V conversion circuit. The I-V conversion circuit converts a current that has flowed through the metal electrode into a voltage and outputs a signal corresponding to the intensity of the incident measured light as a detection signal. Thereby, at a timing when the probe pulse light enters the light reception unit 14, detection of the measured light that enters the light reception unit 14 is performed. The embodiment is not limited to an example in which the light reception unit 14 is the photoconductive antenna, and the detection may be performed, for example, by using an electro-optic crystal (EO crystal) that has a zinc blende structure such as zinc telluride (ZnTe) and generating birefringence by applying an electric field to the EO crystal.

The first pulse light that enters the optical fiber 13 from the delay time control unit 12 and the measured light that is emitted from the emission unit 3 and is received by the light reception surface of the light reception unit 14 have a correlation on a time axis. The first pulse light having energy controlled by the delay control unit 12 enters the light reception unit 14 with a delay time corresponding to the energy. By increasing or decreasing the energy, the timing at which the pump pulse light enters the emission unit 3 and the timing at which the probe pulse light which is the first pulse light emitted from the optical fiber 13 enters the light reception unit 14 can be changed relative to each other. That is, the time difference between the timing at which the measured light that is emitted from the emission unit 3 enters the light reception unit 14 through the measured object 2 and the timing at which the probe pulse light enters the light reception unit 14 (that is, a detection timing at which the measured light is detected) can be changed.

The terahertz time domain spectrometer 1 detects the measured light at each of a plurality of different time differences while changing the time difference described above, and the measurement data generation portion 202 synthesizes a time domain waveform (detection signal) of the measured light detected by the terahertz time domain spectrometer 1. The measurement data generation portion 202 performs Fourier transform of the time domain waveform synthesized by the measurement data generation portion 202 and calculates a spectral intensity (amplitude information of the measured light, phase information, or the like) of the measured light.

The first pulse light is pulse light that is emitted from the laser light source 10 described above, and a pulse temporal width is about 100 femtoseconds. Accordingly, the pulse temporal width of the probe pulse light is also about 100 femtoseconds. On the other hand, the pulse width of the measured light that is detected by the light reception unit 14 is about several picoseconds. As described above, since the measured light that has entered the light reception unit 14 is detected only at a timing when the probe pulse light is incident on the light reception unit 14, a temporal width (that is, the detection time) when the light reception unit 14 can detect the measured light is about 100 femtoseconds, which is the temporal width of the probe pulse light. This is very short relative to the pulse width of the measured light. Therefore, in the detection time of the light reception unit 14 associated with one incidence of the probe pulse light, only a very small portion of the time domain waveform of one measured light can be detected. Accordingly, in order to detect one measured light from the beginning to the end of the time domain waveform, by performing detection a plurality of times (for example, 800 times) and synthesizing while changing the detection timing at the light reception unit 14, a detection signal corresponding to the one measured light from the beginning to the end of the time domain waveform is obtained. That is, in the detection of the plurality of times, each of different positions on the time domain waveform of the one measured light is detected, and by synthesizing the results by the measurement data generation portion 202, the temporal change of the intensity of the one measured light, that is, the entire time domain waveform is obtained.

The intensity at each detection timing of the measured light detected by the light reception unit 14 is converted to a voltage signal by the IV conversion circuit and is sequentially output as a detection signal to the control unit 20. These detection signals are synthesized by the measurement data generation portion 202 of the control unit 20, and thereby, the time domain waveform of the intensity of the measured light is obtained as the time domain waveform of the voltage signal. The A-D conversion is performed on the detection signal by the measurement data generation portion 202, and by applying Fourier transform on the generated digital time domain waveform, amplitude information at each frequency is acquired. The measurement data generation portion 202 performs a similar process on the detection signal that is output from the light reception unit 14 at each time when the irradiation position is changed by the drive mechanism 18 and acquires amplitude information for each irradiation position. On the basis of the amplitude information at each frequency acquired for each irradiation position, the measurement data generation portion 202 focuses on a substance-specific absorption spectral structure, identifies a substance contained in the measurement object 2 and the distribution of the substance, and generates a measurement image that represents the internal state of the measurement object 2. The time domain waveform of the measured light and the measurement image of the measured object 2 are displayed, for example, on a display device (not shown) or the like.

Hereinafter, the relationship between the energy of the probe pulse light that enters the light reception unit 14 and the delay time (delay amount) is described.

As described above, in the terahertz measurement device 100 of the present embodiment, the first pulse light propagates through the optical fiber 13 while maintaining a state close to a fundamental soliton. The delay time that occurs when the first pulse light (hereinafter, also referred to as a soliton) in a state of a soliton propagates through the optical fiber 13 depends on the pulse temporal width of the soliton as described below.

It is known that a soliton that propagates in a nonlinear medium is subject to Raman scattering and generates a self-frequency shift $\Delta\omega$ (RIFS; Raman-Induced Frequency Shift). The amplitude is approximately represented by the following Expressions (1) and (2) (Reference document: Agrawal, Nonlinear Fiber Optics, Chapter 5).

$$\Delta\omega = -Cz \quad (1)$$

$$C = 8\tau_R|\beta_2|/15T_0^4 \quad (2)$$

Expression (1) shows that the self-frequency shift $\Delta\omega$ is proportional to z, which is the propagation length of a soliton from an incident end of the optical fiber 13. In Expression (1), C is a coefficient and is represented by Expression (2). In Expression (2), the $\tau_R$ is a value relating to a gain (Raman gain) due to Raman scattering and is about 3 fs (femtoseconds), and $\beta_2$ represents a second order dispersion of the optical fiber 13 and is about $-0.02$ ps²/m when pulse light having a wavelength of about 1.5 μm enters an ordinary single-mode fiber. $T_0$ has a relationship of $T_0 = T_{FWHM}/1.763$ with the pulse temporal width (full width at half maximum) $T_{FWHM}$ of the soliton.

The change in inverse of the group velocity $v_g$ of a soliton is represented by the following Expression (3).

$$\Delta(1/v_g) = \beta_2 \Delta\omega = -C\beta_2 z \quad (3)$$

Accordingly, when the soliton propagates through the optical fiber 13 having a length (propagation distance) L, the delay time τ due to the group velocity change of the soliton after propagation is represented as Expression (4) by integrating Expression (3) along the propagation direction of the soliton in the optical fiber 13.

[Equation 1]

$$\tau = \int_0^L dz \Delta\left(\frac{1}{v_k}\right) = -\frac{C}{2}\beta_2 L^2 \quad (4)$$

From Expressions (2) and (4), the delay time τ of the soliton due to the self-frequency shift is inversely proportional to the fourth power of the pulse temporal width $T_{FWHM}$ and is proportional to the square of the propagation distance L. In the soliton of the pulse temporal width $T_{FWHM}$=150 fs, C is a value of about 0.61/ps·m, and therefore, the change rate of the center frequency of the soliton associated with the propagation of the optical fiber 13 is about 0.097 THz/m from Expression (1). This is converted to a wavelength of about 0.8 nm/m. The delay time T of the soliton due to this wavelength change is about $6.1 \times 10^{-3} L^2$ ps from Expression (4), and when the length L of the optical fiber 13 is, for example, 70 m, the delay time τ can be about 30 ps.

It is known that the fundamental soliton has a property of, when being subjected to perturbation such as energy and disturbed from the state of the fundamental soliton, converging into the fundamental soliton (in general, another fundamental soliton having a different pulse temporal width) while adjusting the pulse temporal width or the like. With respect to the fundamental soliton, when the peak power of the fundamental soliton is p, there is a relationship of $\gamma p \approx |\beta_2|/T_0^2$. Here, γ is a nonlinear coefficient. By using the energy $E \approx pT_0$, the Expression described above is represented as $\gamma E \approx |\beta_2|/T_0$. From this relationship, it is expected that in the soliton, $T_0$ is decreased in accordance with the increase in the energy E, and conversely, $T_0$ is increased in accordance with the decrease in the energy E. That is, when the energy E of the soliton is increased, the pulse temporal width $T_{FWHM}$ of the soliton is decreased, and conversely, when the energy E of the soliton is decreased, the pulse temporal width $T_{FWHM}$ of the soliton is increased.

That is, from Expressions (2) and (4) described above, it is found that it is possible to change the delay time τ of the soliton by changing the energy of the soliton and changing the pulse temporal width $T_{FWHM}$. In the present embodiment, on the basis of the knowledge described above, the delay control unit 12 changes the pulse temporal width $T_{FWHM}$ of the soliton that propagates through the optical fiber 13 by controlling the energy E of the first pulse light that enters the optical fiber 13. At the delay time τ that is changed accordingly, the probe pulse light that is emitted from the optical fiber 13 enters the light reception unit 14.

Next, the effect of Raman scattering during propagation through the optical fiber 13 is described for the first pulse light with an energy E controlled by the delay control unit 12 having the configuration described above. The effect of Raman scattering in the optical fiber 13 can be represented approximately by the following Expression (5) using a term of the lowest order.

[Equation 2]

$$\frac{\partial A(z,T)}{\partial z} = -i\frac{\beta_2}{2}\frac{\partial^2 A}{\partial T^2} + i\gamma|A|^2 A - i\gamma\tau_R A\frac{\partial|A|^2}{\partial T} \quad (5)$$

Here, A (z, T) represents an amplitude excluding a carrier (carrier waves) frequency component corresponding to a wavelength of 1550 nm, that is, an amplitude (slowly varying amplitude) that changes moderately. The nonlinear coefficient γ is represented by $\gamma=2\pi n_2/\lambda A_{eff}$. $n_2$ is a nonlinear refractive index, and $A_{eff}$ is a mode cross-sectional area of the optical fiber 13. In an ordinary quartz-based (silica-based) single-mode optical fiber, $n_2$ is approximately $3.0\times 10^{-20}$ m$^2$/W, and $A_{eff}$ is approximately 75 um$^2$. Further, γ is approximately $1.5\times 10^{-3}$/W·m. By setting the amplitude at z=0, that is, an incident end of the optical fiber 13 to A(0, T)=$(p_0)^{1/2}$sech (T/T$_0$), and integrating Expression (5) along a z-direction (a propagation direction of the first pulse light in the optical fiber 13), it is possible to know the propagation of the soliton in the optical fiber 13. In the Expression of A (0, T) described above, T$_0$ is approximately 85 fs, and p$_0$ is approximately 1784 W.

Figure 3:
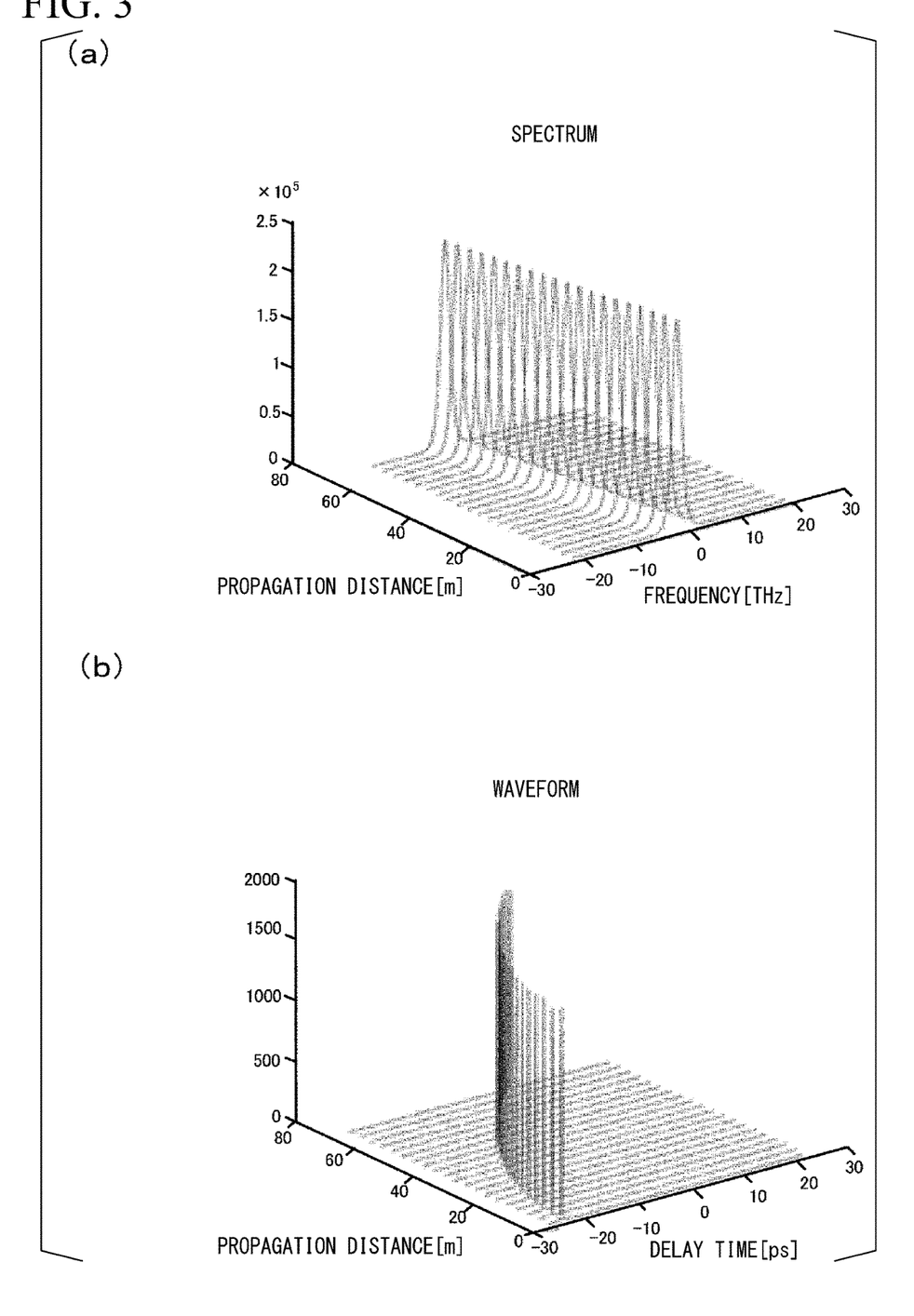
FIG. 3 is a view showing calculation results of a relationship among a frequency, a spectrum, and a propagation distance of a soliton in an optical fiber and a relationship among a delay time, a waveform, and a propagation distance of a soliton in an optical fiber.

FIG. 3 is a view showing a calculation result of a spectrum change with respect to a propagation distance in the optical fiber 13 when the soliton of a pulse temporal width $T_{FWHM}$=150 fs (femtoseconds) propagates through the optical fiber 13 having a length of 70 m. FIG. 3(a) shows a relationship among a frequency, a spectrum, and a propagation distance of the soliton in the optical fiber 13, and FIG. 3(b) is a graph showing a relationship among a delay time, a waveform, and a propagation distance of the soliton in the optical fiber 13. As shown in FIG. 3(a), the center frequency of the soliton decreases substantially linearly in accordance with propagation in the optical fiber 13. That is, red shift occurs. That is, the group velocity of the soliton decreases substantially linearly in accordance with the propagation through the optical fiber 13. Expression (3) described above can be represented approximately as $\Delta v_g \approx v_2^2 C\beta_2 z$. The group velocity of the soliton decreases, and thereby, as shown in FIG. 3(b), the soliton is delayed in accordance with the propagation in the optical fiber 13.

Figure 4:
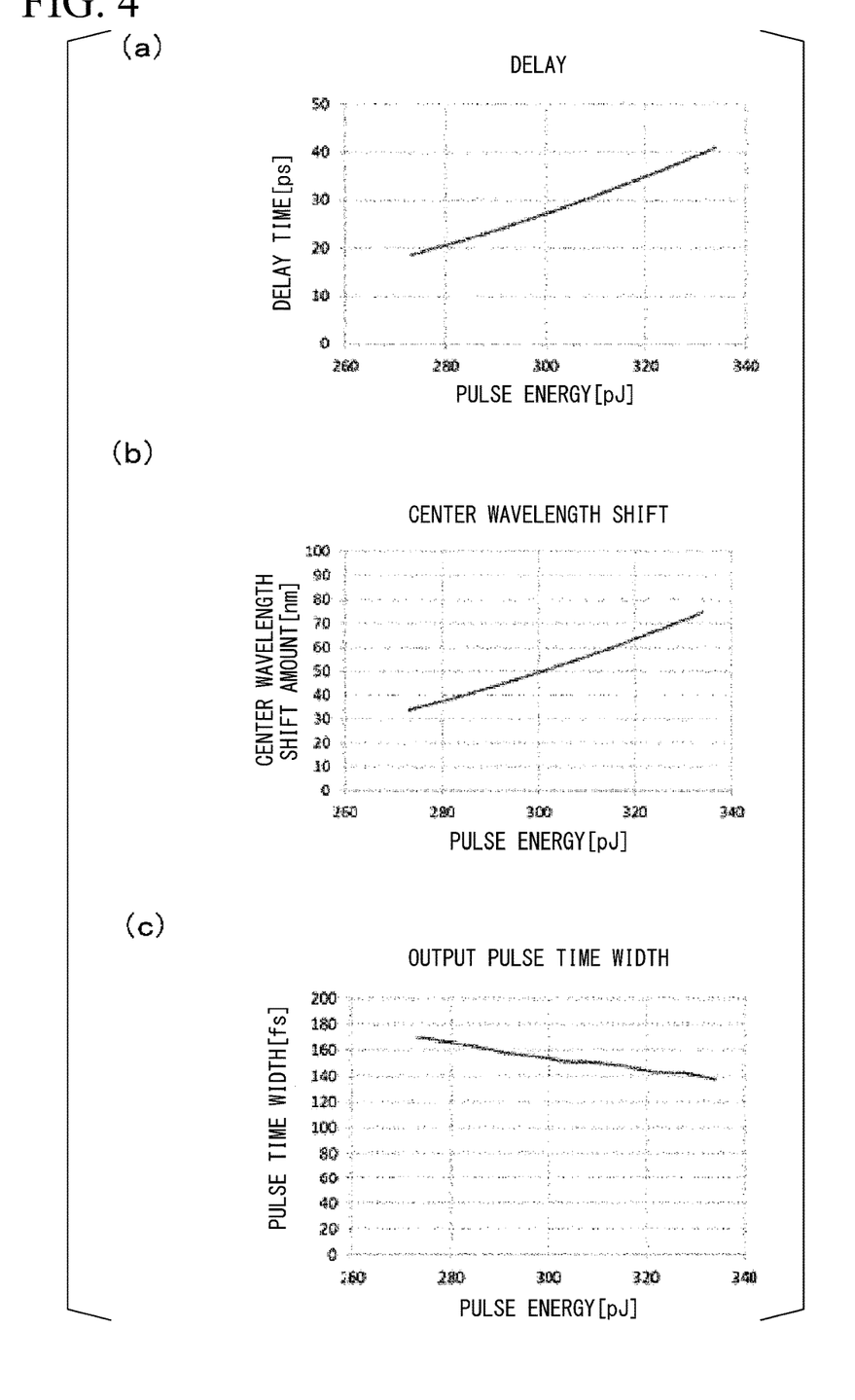

FIG. 4(a) is a graph showing a relationship between a pulse energy of first pulse light that enters the optical fiber 13 and a delay time when being emitted from the optical fiber 13 (at the end of the optical fiber 13). Here, it is assumed that the pulse temporal width of the first pulse light that enters the optical fiber 13 is not changed and is constant. The vertical axis represents a delay time, and the horizontal axis represents a pulse energy. From FIG. 4(a), it is found that when the pulse energy of the first pulse light is reduced from about 310 pJ by about 10 percent, the delay time can be changed from 30 ps to about 20 ps, and conversely, when the pulse energy is increased by about 10 percent, the delay time can be changed from 30 ps to about 40 ps.

FIGS. 4(b) and (c) are graphs showing relationships between a pulse energy of the first pulse light that enters the optical fiber 13, and a center wavelength shift amount and a pulse temporal width of the first pulse light when being emitted from the optical fiber 13 (at the end of the optical fiber 13), respectively.

From FIG. 4(b), it is found that when the pulse energy of the first pulse light when entering the optical fiber 13 is changed by about ±10%, the center wavelength of the first pulse light when being emitted from the optical fiber 13 (at the end of the optical fiber 13) is changed by about ±20 nm. Further, from FIG. 4(c), it is found that when the pulse energy of the first pulse light when entering the optical fiber 13 is changed by about ±10%, the pulse temporal width of the first pulse light when being emitted from the optical fiber 13 (at the end of the optical fiber 13) is changed by about ±10%.

As described by FIGS. 4(a) to (c), the delay time can be changed in an appropriate range by controlling the energy of the first pulse light when entering the optical fiber 13. On the other hand, the change in the center wavelength and the pulse temporal width of the first pulse light at the end of the optical fiber 13 in accordance with this may affect the detection efficiency of the measured light at the light reception unit 14. If necessary, it is preferable to correct this variation in the detection efficiency on the basis of a calculation result according to a simulation or the like or a measurement result according to an experiment.

Next, an example of a specific configuration of the delay control unit 12 for controlling the energy E of the first pulse light is described.

Figure 5:
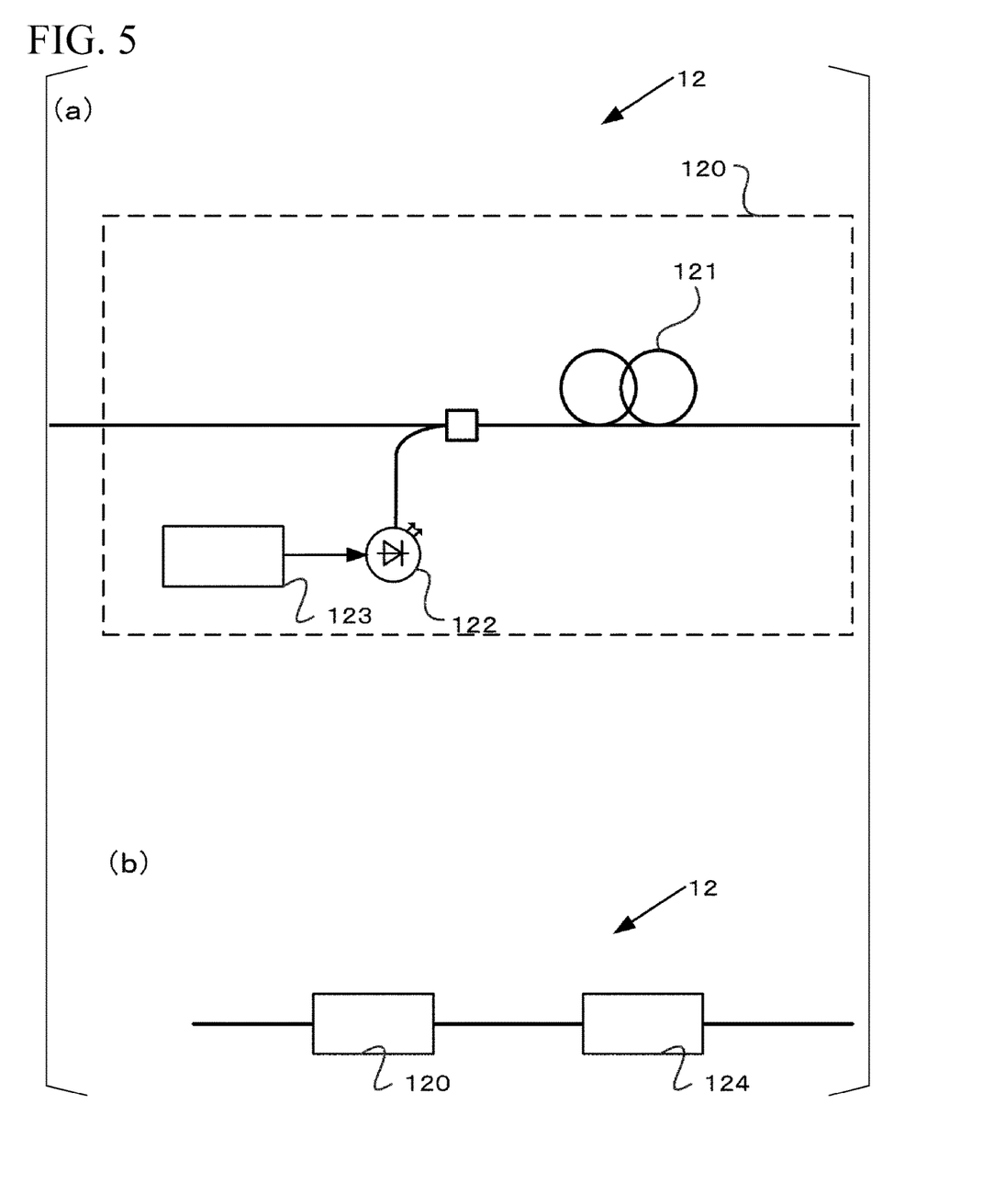
FIG. 5 is a block diagram schematically showing an example of a delay control unit included in the terahertz time domain spectrometer according to the first embodiment.

FIG. 5 is a block diagram schematically showing an example of the delay control unit 12. In the configuration shown in FIG. 5(a), the delay control unit 12 includes an optical amplifier 120 and controls energy E of the first pulse light by controlling the gain of the optical amplifier 120. The optical amplifier 120 has an amplification fiber 121, an excitation light source 122, and an electric power control unit 123 that controls electric power supplied to the excitation light source 122. In the optical amplifier 120, the gain of the amplification fiber 121 is controlled by controlling the excitation light source 122. The amplification fiber 121 is, for example, a fiber to which a rare-earth element is added (doped) and is excited, for example, by a known core excitation method.

The delay control unit 12 may be a forward excitation type that mixes waves using an optical combiner or the like such that the excitation light and the first pulse light propagate in the same direction and excites the amplification fiber 121 or may be a backward excitation type that mixes waves using an optical combiner or the like such that the excitation light propagates through the amplification fiber 121 in a direction opposite to the first pulse light and excites the amplification fiber 121. Further, the delay control unit 12 may be a double-pass excitation type that allows the first pulse light amplified by passing through the amplification fiber 121 to be reflected by a mirror or the like, pass through the amplification fiber 121 again, and be emitted to the outside.

The excitation light source 122 includes, for example, a light-emitting element using a semiconductor laser (laser diode) or a Raman laser. The excitation light that is output from the excitation light source 122 propagates through the amplification fiber 121, and the rare-earth element becomes an excitation state in the amplification fiber 121. When the first pulse light enters the amplification fiber 121 in this state, the amplification fiber 121 causes an induced emission that emits light having the same wavelength and the same phase as the first pulse light. By this induced emission, the amplification fiber 121 amplifies the incident first pulse light.

The electric power control unit 123 includes a circuit for controlling electric power supplied to the excitation light source 122. The electric power control unit 123 is controlled by the delay time control portion 201 of the control unit 20 and modulates electric power (for example, a current or a voltage) supplied to the light-emitting element of the excitation light source 122. Thereby, the pulse energy of the first pulse light that propagates through the amplification fiber 121 is controlled, and as a result, the delay time of the first pulse light (probe pulse light) associated with the propagation through the optical fiber 13 as described above is controlled. The relationship between the electric power supplied to the excitation light source 122 and the delay time of the probe pulse light is acquired in advance by simulation, experiment, or the like and is stored in advance in a memory (not shown) as relation data. The delay time control portion 201 controls the electric power supplied to the excitation light source 122 from the electric power control unit 123 at a predetermined cycle on the basis of this relation data. Thereby, the intensity of the excitation light from the excitation light source 122 is modulated at each predetermined time interval, and therefore, the gain of the optical amplifier 120 is changed at each predetermined time interval. As a result, the energy E of the first pulse light that is emitted from the optical amplifier 120 and enters the optical fiber 13 is changed at each predetermined time interval, and therefore, the delay time of the probe pulse light that is emitted from the optical fiber 13 and enters the light reception unit 14 is changed at each predetermined time interval. The cycle (time interval) that changes the gain of the optical amplifier 120 can be equal to or more than 1 kHz (1 msec or less). That is, the delay time of the probe pulse light that is emitted from the optical fiber 13 can be controlled at a high speed.

The above example is described using a case in which the optical amplifier 120 includes the amplification fiber 121 and the excitation light source 122; however, the embodiment is not limited to the example. A semiconductor amplifier may be applied as the optical amplifier 120, the electric power supplied from the electric power control unit 123 to the optical amplifier 120 may be modulated, and the energy E of the first pulse light may be controlled.

FIG. 5(b) is a block diagram schematically showing another example of the delay control unit 12. The delay control unit 12 shown in FIG. 5 (b) includes the optical amplifier 120 shown in FIG. 5(a) and a modulator 124. The modulator 124 is, for example, a known electro-optic modulator (EOM) or an acousto-optic modulator (AOM). In the delay control unit 12 shown in FIG. 5(b), when the electro-optic modulator is used as the modulator 124, by controlling the magnitude of the electric field applied to the modulator 124 and changing the transmittance of the modulator 124, the delay time control portion 201 controls the energy E of the first pulse light and emits the first pulse light to the optical fiber 13. On the other hand, the electric power control unit 123 controls electric power supplied to the excitation light source 122 to be constant and holds the excitation state of the rare-earth element in the amplification fiber 121 to be constant.

In the delay control unit 12 shown in FIG. 5(b), when the acousto-optic modulator is used as the modulator 124, the delay time control portion 201 changes the diffraction efficiency by controlling the amplitude of a high-frequency electric signal applied to the modulator 124, controls the energy E of the first pulse light, and outputs the first pulse light to the optical fiber 13. Also in this case, the electric power control unit 123 controls electric power supplied to the excitation light source 122 to be constant and holds the excitation state of the rare-earth element in the amplification fiber 121 to be constant.

In the delay control unit 12 shown in FIG. 5(b), as an example, a case is shown in which the first pulse light is modulated by the modulator 124 after amplification by the optical amplifier 120; however, the first pulse light may be modulated by the modulator 124 and then amplified by the optical amplifier 120.

Further, in the example shown in FIG. 5(b), in a case where the intensity of the first pulse light that enters the modulator 124 is sufficiently large, the delay control unit 12 may not include the optical amplifier 120. In this case, a configuration is employed in which the energy E of the first pulse light is modulated by the modulator 124, and the first pulse light is emitted to the optical fiber 13.

Further, the pump pulse light may be amplified and enter the emission unit 3. In this case, the terahertz time domain spectrometer 1 has a fixed gain amplifier in the optical path L3.

EXAMPLES

A terahertz time domain spectrometer 1 in an example is described. In the present example, the optical amplifier 120 shown in FIG. 5(a) is used as the delay control unit 12. The laser light source 10 is a master oscillator as described above and generates pulse light (a fundamental soliton) having a pulse temporal width of 150 fs. The optical path L1 is a single mode optical fiber having a length of 0.5 m. The branch unit 19 is a branch coupler which causes the pulse light that has propagated through the optical path L1 to branch into two portions at 50:50, and generates probe pulse light and pump pulse light.

The optical path L2 through which the probe pulse light propagates is a fiber having a length of 0.2 m. The amplification fiber 121 is an erbium-doped fiber to which a high concentration of erbium (Er) is doped and has a length of 0.3 m. Thereby, the delay control unit 12 can obtain a gain of about 3 to 5 dB (×2 to 3). The gain is set such that the first pulse light which enters the optical fiber 13 has energy similar to that of the fundamental soliton having a pulse width of 150 fs. The optical fiber 13 is a single-mode optical fiber having a length of 70 m. In branching by the branch coupler or an amplification process by the erbium-doped fiber, the pulse temporal width of the first pulse light is changed due to dispersion or a nonlinear effect in these fibers. However, since the total length of these fibers is 0.5 m and is not so long, even in the terahertz time domain spectrometer 1 in the example, it is possible to obtain a result substantially similar to a calculation result shown in FIG. 3 and FIG. 4(a) described above. That is, the probe pulse light is emitted from the optical fiber 13 and enters the light reception unit 14 in a state where the delay time occurs by the optical fiber 13 in response to the modulation of the energy E set by the delay control unit 12.

According to the first embodiment described above, the following advantages are obtained.

(1) The terahertz time domain spectrometer 1 includes: the light reception unit 14 that has a light reception surface which receives measured light; the laser light source 10 that generates pulse light; the optical fiber 13 which first pulse light enters; and the delay control unit 12 that controls the energy of the first pulse light which enters the optical fiber 13. The optical fiber 13 has anomalous dispersion, and the first pulse light that enters the optical fiber 13 is emitted from the optical fiber 13 as probe pulse light with a delay tune corresponding to the energy. The probe pulse light enters the light reception unit 14, and when the probe pulse light emitted from the optical fiber 13 enters the light reception unit 14, the light reception unit 14 outputs a signal that depends on the intensity of the measured light which the light reception surface is receiving. Since the conventional apparatus uses a drive mechanism that mechanically changes an optical path length of the probe pulse light, for example, a time of about 10 ms to 100 ms is required to set each of a plurality of predetermined delay times and detect the measured light from the measured object 2. On the other hand, the terahertz time domain spectrometer 1 of the first embodiment controls the delay time of the probe pulse light by means of an electric circuit instead of a mechanical drive configuration. Thereby, a delay time control with a high speed and a high degree of freedom becomes possible and contributes to shortening of the measurement time. Further, since a spectral measurement becomes possible only by a solid-state element of which the arrangement is fixed, it is possible to realize a spectrometer that is not susceptible to external vibration or the like and that has excellent reliability and excellent portability.

(2) The delay control unit 12 includes the optical amplifier 120 which amplifies the first pulse light and causes the first pulse light to enter the optical fiber 13, controls the gain of the optical amplifier 120, and controls the energy of the first pulse light. Thereby, it becomes possible to control the delay time by a simple configuration without using a mechanical configuration.

(3) The optical amplifier 120 includes the amplification fiber 121 and the excitation light source 122 that excites the amplification fiber 121, and the delay control unit 12 controls electric power to the excitation light source 122 and controls the gain of the optical amplifier 120. Thereby, it is possible to control the energy E of the first pulse light at a high speed of 1 kHz or more, and the measurement time can be shortened compared to a case in which the delay time of the probe pulse light is controlled by using a mechanical configuration.

(4) The delay control unit 120 modulates the first pulse light by the modulator 124 that uses an electro-optic element or an acousto-optic element. Thereby, since it is possible to control the energy E of the first pulse light at a high speed, the delay time can be controlled at a high speed compared to a case in which a mechanical configuration is used.

(5) The delay control unit 120 further includes the optical amplifier 121 that amplifies the first pulse light, and the modulator 124 modulates the first pulse light amplified by the delay control unit 120. Thereby, it is possible to prevent the intensity attenuation of the first pulse light due to an external factor or an optical component that constitutes the optical path of the first pulse light.

(6) By controlling the energy E of the first pulse light and changing the delay time, the terahertz time domain spectrometer 1 changes the time difference between the timing at which the measured light is received by the light reception surface of the light reception unit 14 and the timing at which the probe pulse light enters the light reception unit 14 and calculates the time domain waveform of the measured light on the basis of the intensity of the measured light at each of different time differences. Thereby, it is possible to acquire the time domain waveform of terahertz pulse light in a short period of time as compared to a case in which a mechanical configuration is used for controlling the delay time of the probe pulse light.

(7) The first pulse light that enters the optical fiber 13 and the measured light have a correlation on a time axis. A plurality of times (for example, 800 times) of irradiation of the measured light are performed onto the same measurement position of the measured object 2. During this time, by controlling the energy E of the first pulse light, the delay time of the probe pulse light is changed. As a result, it becomes possible to detect the time domain waveform of the measured light in a short period of time.

(8) The first pulse light from the laser light source 10 excites a soliton in the optical fiber 13. Accordingly, by the magnitude of the effect of Raman scattering in the optical fiber 13 in response to the energy E of the first pulse light, the delay time of the probe pulse light can be controlled at a high speed.

(9) The measurement data generation portion 202 generates a measurement image that represents a measurement result inside the measured object 2 on the basis of a detection signal output from the light reception unit 14. Thereby, since the measurement image is generated from a detection signal acquired at a high speed by the terahertz time domain spectrometer 1, the measurement result of the measured object 2 can be acquired in a shorter period of time than the related art, which contributes to shortening of the measurement time.

(10) The measurement data generation portion 202 generates a measurement image on the basis of a result of Fourier transform of the time domain waveform of the measured light received by the light reception surface of the light reception unit 14 via the measured object 2 based on the detection signal. Thereby, the user can observe, by way of an image, the internal state of the measured object 2.

Second Embodiment

A terahertz time domain spectrometer according to a second embodiment is described with reference to the drawings. In the following description, the same reference numeral is given to the same component as that of the first embodiment, and a difference point is mainly described. The points which are not specifically described are similar to those of the first embodiment. The second embodiment is different from the first embodiment in that a terahertz time domain spectrometer controls both energies of the first pulse light and the second pulse light and controls the delay time of the probe pulse light and the pump pulse light. Hereinafter, details are described.

Figure 6:
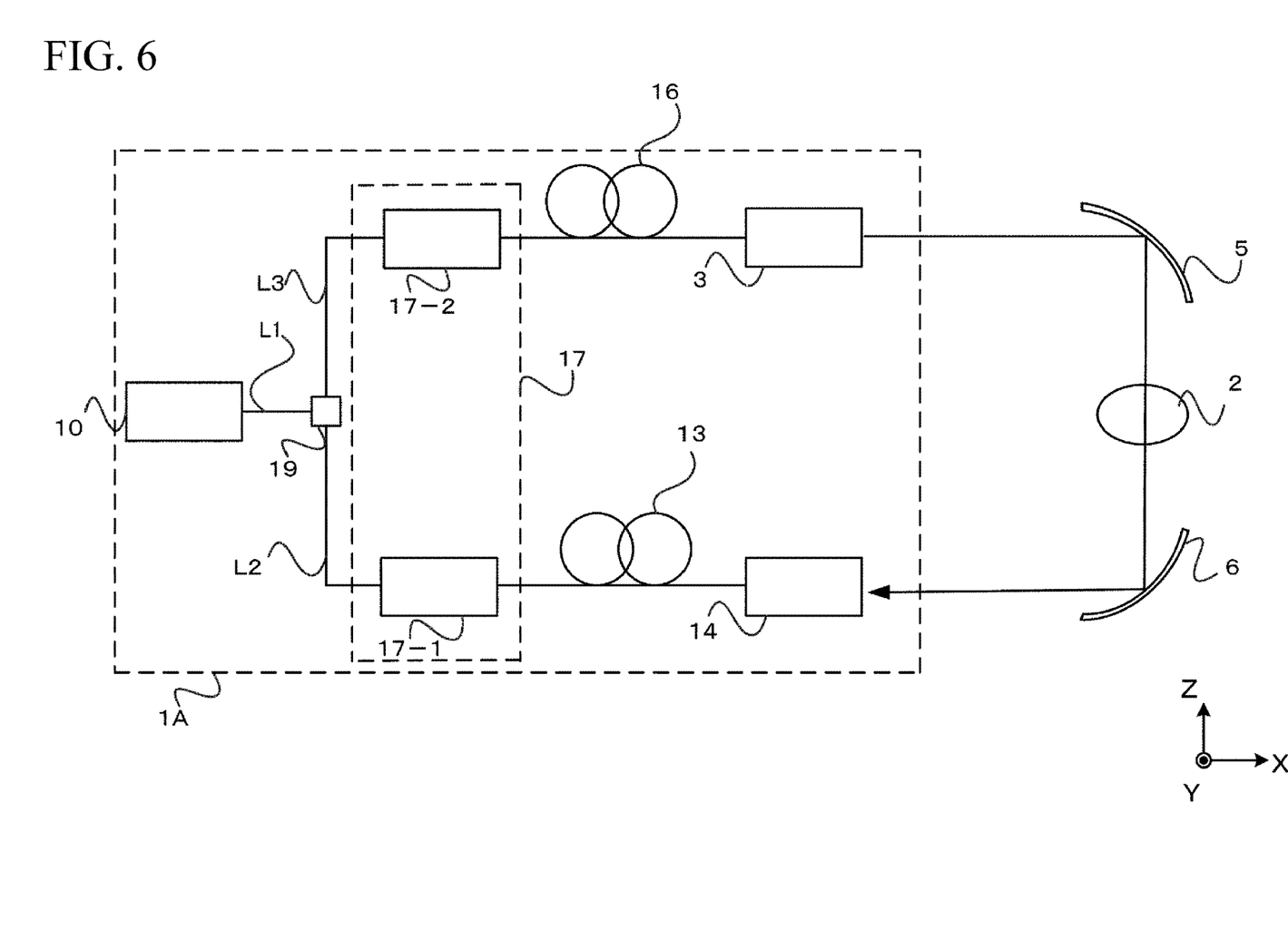
FIG. 6 is a block diagram schematically showing a main part configuration of a terahertz time domain spectrometer according to a second embodiment.

FIG. 6 is a block diagram schematically showing an example of a main part configuration of a terahertz time domain spectrometer 1A according to the second embodiment. The terahertz time domain spectrometer 1A includes an emission unit 3, a laser light source 10, an optical fiber 13, a light reception unit 14, a branch unit 19, a first optical unit 5, and a second optical unit 6 that are similar to those of the first embodiment and further includes a delay control unit 17 and a second optical fiber 16 that are different from those of the first embodiment. The second optical fiber 16 has anomalous dispersion similarly to the optical fiber 13 and is provided on an optical path L3 through which the second pulse light that has branched at the branch unit 19 propagates toward the emission unit 3.

In FIG. 6, the measured object 2 is shown together with the terahertz time domain spectrometer 1A.

The delay control unit 17 includes a first delay control portion 17-1 provided on an optical path L2 in which the first pulse light propagates to the light reception unit 14 and a second delay control portion 17-2 provided on an optical path L3 in which the second pulse light propagates to the emission unit 3. Each of the first delay control portion 17-1 and the second delay control portion 17-2 has a configuration similar to the delay control unit 12 described with reference to FIGS. 5(a) and (b) of the first embodiment. That is, each of the first delay control portion 17-1 and the second delay control portion 17-2 may be the variable gain optical amplifier 120 constituted of a fiber amplifier, a semiconductor amplifier, or the like shown in FIG. 5(a), may be the modulator 124 such as an acousto-optic modulator (AOM) or an electro-optic modulator (EOM) shown in FIG. 5(b), or may have the above-described modulator 124 and a fixed gain optical amplifier.

Similarly to the first embodiment, the first delay control portion 17-1 changes the delay time of the first pulse light that propagates through the optical fiber 13 by controlling the energy E1 of the first pulse light. The second delay control portion 17-2 also changes the delay time of the second pulse light that propagates through the optical fiber 16 by controlling the energy E2 of the second pulse light. In the present embodiment, the delay time control portion 201 performs a control such that a control amount of the energy E of the first pulse light by the first delay control portion 17-1 and a control amount of the energy E of the second pulse light by the second delay control portion 17-2 are different.

Specifically, the delay time control portion 201 performs a control such that the control amount of the energy E1 of the first pulse light by the first delay control portion 17-1 and the control amount of the energy E2 of the second pulse light by the second delay control portion 17-2 are in an opposite direction (reverse phase) to each other. For example, the first delay control portion 17-1 controls a delay T1 of the probe pulse light which is the first pulse light emitted from the optical fiber 13 to be larger than a reference delay T0 by increasing the energy E1 of the first pulse light. On the other hand, the second delay time control unit 17-2 controls a delay T2 of the pump pulse light which is the second pulse light emitted from the second optical fiber 16 to be smaller than a reference delay T0' by decreasing the energy E2 of the second pulse light. A time difference between a timing when the pump pulse light enters the emission unit 3 and a timing when the probe pulse light enters the light reception unit 14 becomes T1-T2.

Figure 7:
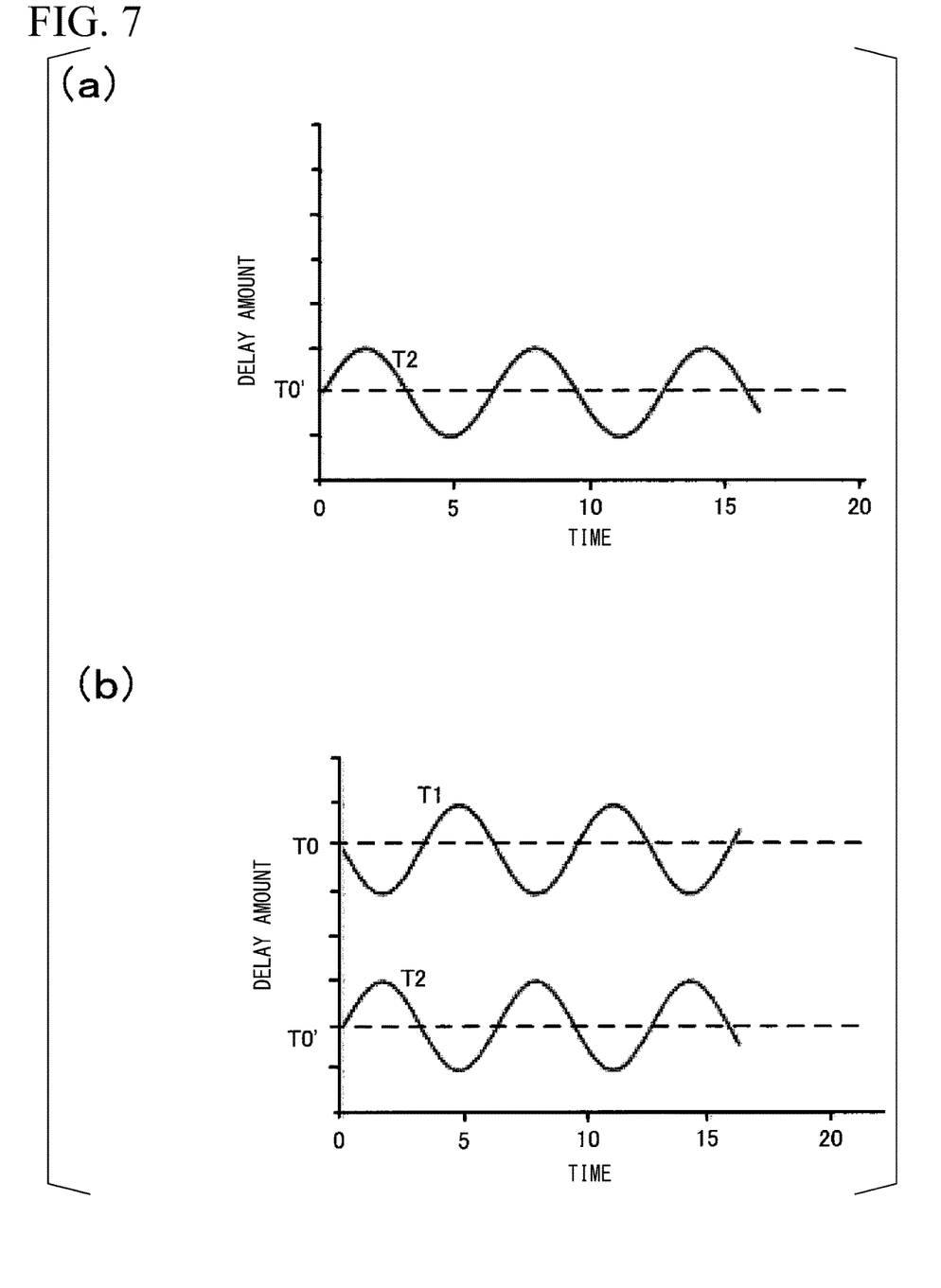
FIG. 7 is a view showing a temporal change of a delay amount.

FIG. 7 shows a temporal change of the delay amount. FIG. 7(a) shows a temporal change of the delay T2 of the pump pulse light, and FIG. 7(b) shows a temporal change of a time difference T1-T2 between the delay T1 of the probe pulse light and the delay T2 of the pump pulse light. As shown in FIG. 7(b), it is found that the time difference T1−T2, which is a delay amount obtained by the present embodiment, increases the effective range of the delay time as compared to a case in which a delay amount is given only by T2 referenced to T0' as shown in FIG. 7(a).

According to the second embodiment described above, in addition to the advantages obtained by the first embodiment, the following advantages are obtained.

(1) The second optical fiber 16 which the second pulse light branched at the branch unit 19 enters has anomalous dispersion, and the second delay time control unit 17-2 of the delay time control portion 201 controls the energy E2 of the second pulse light that enters the second optical fiber 16. The second pulse light that enters the second optical fiber 16 is emitted from the second optical fiber 16 with a delay time corresponding to the energy E2 of the second pulse light. When the second pulse light that is emitted from the second optical fiber 16 enters a photoconductive member of the emission unit 3 as pump pulse light, the measured light is generated. Thereby, similarly to a case in which the delay time of the probe pulse light of the first embodiment is controlled, it becomes possible to control the delay time of the pump pulse light at a high speed.

(2) The delay control unit 201 controls the energy E1 of the first pulse light that enters the optical fiber 13 and the energy E2 of the second pulse light that enters the second optical fiber 16 in a reverse phase. Thereby, it is possible to increase a time difference between a timing when the pump pulse light enters the emission unit 3 and a timing when the probe pulse light enters the light reception unit 14. That is, it is possible to increase the effective range of the delay time.

The following modification is also within the scope of the present invention, and one or more of modification examples can be combined with the embodiments described above.

In the first embodiment and the second embodiment described above, an amplifier for amplifying pulse light may be provided on the optical path L1 before the pulse light emitted from the laser light source 10 branches into the first pulse light and the second pulse light. In this case, as the amplifier, for example, a fiber amplifier, a semiconductor amplifier, or the like can be used.

Unless the feature of the present invention is impaired, the present invention is not limited to the embodiments described above, and other embodiments that are conceivable within the scope of the technical ideas of the present invention are also included within the scope of the present invention.

The disclosure contents of the following priority application are incorporated herein by reference.

Japanese Patent Application No. 2019-53682 (filed on Mar. 20, 2019)

DESCRIPTION OF THE REFERENCE SYMBOLS 1, 1A Terahertz time domain spectrometer
3 Emission unit
10 Laser light source
12, 17 Delay control unit
13 Optical fiber
14 Light reception unit
16 Second optical fiber
19 Branch unit
20 Control unit
120 Optical amplifier
121 Amplification fiber
122 Excitation light source
123 Current control unit
124 Modulator
201 Delay time control portion
202 Measurement data generation portion

The invention claimed is:

1. A terahertz light detector comprising:
a pulse laser that generates pulse light;
a control unit that controls an energy of the pulse light emitted from the pulse laser by a variable gain optical amplifier or a modulator;
an optical member having an anomalous dispersion and which the pulse light whose energy is controlled by the control unit enters; and
a light reception unit that receives the terahertz light from a measured object and that outputs a signal that is dependent on an intensity of the terahertz light received from the measured object when the pulse light emitted from the optical member enters the light reception unit,
wherein
the optical member causes the pulse light whose energy is controlled by the control unit to have a delay time corresponding to the energy of the pulse light, and the light reception unit performs detection of each of different positions on a time domain waveform of one measured terahertz light received from the measured object and outputs the signal by changing a timing of the detection.

2. The terahertz light detector according to claim 1, wherein the control unit (i) includes a first amplifier which amplifies the pulse light and causes the first pulse light to enter the optical member, and (ii) controls a gain of the first amplifier to control the energy of the pulse light.

3. The terahertz light detector according to claim 2, wherein
the first amplifier includes an amplification fiber and an excitation light source that excites the amplification fiber, and
the control unit controls the excitation light source to control the gain of the first amplifier.

4. The terahertz light detector according to claim 1, wherein the control unit modulates the pulse light by using an electro-optic element.

5. The terahertz light detector according to claim 4, wherein
the control unit further includes a second amplifier that amplifies the pulse light, and
the electro-optic element modulates the pulse light amplified by the second amplifier.

6. The terahertz light detector according to claim 1, wherein the optical member comprises an optical fiber.

7. The terahertz light detector according to claim 1, wherein
by changing the delay time, a time difference between a timing at which the terahertz light from the measured object is received by the light reception unit and a timing at which the pulse light emitted from the optical member enters the light reception unit is changed, and
the control unit detects a temporal change of the signal based on a signal dependent on an intensity of the terahertz light received by the light reception unit at each of different time differences.

8. The terahertz light detector according to claim 1, wherein the pulse light that enters the optical member and the terahertz light received from the measured object have a correlation on a time axis.

9. The terahertz light detector according to claim 1, wherein the control unit corrects a change of a detection efficiency in the light reception unit in accordance with a change of the energy of the pulse light which enters the optical member.

10. The terahertz light detector according to claim 1, further comprising:
a branch unit that receives the pulse light from the pulse laser and causes a first portion of the pulse light to branch to be output as pump pulse light,
wherein the pump pulse light output by the branch unit enters a photoconductive member which generates the terahertz light that is sent to the measured object.

11. The terahertz light detector according to claim 10, further comprising:
a second optical member having an anomalous dispersion and which the pump pulse light enters, wherein
the control unit also controls the energy of the pump pulse light that enters the second optical member, and
the pump pulse light that has entered the second optical member is emitted from the second optical member with a delay time corresponding to an energy of the pump pulse light.

12. The terahertz light detector according to claim 11, wherein the control unit controls the energy of the pulse light that enters the optical member and the energy of the pump pulse light that enters the second optical member in a reverse phase.

13. The terahertz light detector according to claim 11, wherein the second optical member comprises an optical fiber.

14. The terahertz light detector according to claim 1, wherein the pulse light excites a soliton in the optical member.

15. A terahertz measurement device comprising:
the terahertz light detector according to claim 1, and
a generation unit that generates an image which represents an internal state of the measured object based on the signal output from the light reception unit.

16. The terahertz measurement device according to claim 15,
wherein the generation unit generates the image by Fourier transform of information representing a temporal change of the signal.

17. The terahertz light detector according to claim 1, further comprising:
a drive mechanism that changes an irradiation position of the terahertz light on the measured object,
wherein the light reception unit outputs the signal from the time domain waveform of the one measured terahertz light each time the irradiation position is changed by the drive mechanism.

18. A terahertz light detector comprising:
a light reception unit that receives terahertz light from a measured object;
a pulse laser that generates pulse light;
a branch unit that receives the pulse light from the pulse laser and outputs a first portion of the pulse light as pump pulse light and outputs a second portion of the pulse light as probe pulse light;
a first optical fiber having an anomalous dispersion and which the probe pulse light enters;
a second optical fiber having an anomalous dispersion and which the pump pulse light enters;
a photoconductive member that receives the pump pulse light from the second optical fiber and that generates the terahertz light that is sent to the measured object; and
a control unit that controls an energy of the probe pulse light which enters the first optical fiber and that controls an energy of the pump pulse light which enters the second optical fiber, wherein
the pump pulse light that has entered the second optical fiber is emitted from the second optical fiber with a delay time corresponding to the energy of the pump pulse light, and
the light reception unit outputs a signal that is dependent on an intensity of the terahertz light received from the measured object when the probe pulse light emitted from the first optical fiber enters the light reception unit.

19. The terahertz light detector according to claim 18, wherein
by changing the delay time, a time difference between a timing at which terahertz light from the measured object is received by the light reception unit and a timing at which the probe pulse light emitted from the first optical fiber enters the light reception unit is changed, and the control unit detects a temporal change of the signal based on a signal dependent on an intensity of the terahertz light received by the light reception unit at each of different time differences.

20. The terahertz light detector according to claim 18, wherein the control unit controls the energy of the probe pulse light that enters the first optical fiber and the energy of the pump pulse light that enters the second optical fiber in a reverse phase.

* * * * *